E. J. McDUFFEE.
ELECTRICALLY DRIVEN FAN OR BLOWER.
APPLICATION FILED MAR. 17, 1905.

919,623.

Patented Apr. 27, 1909.
2 SHEETS—SHEET 1.

Witnesses:

Inventor:
Edgar J. McDuffee,
Atty.

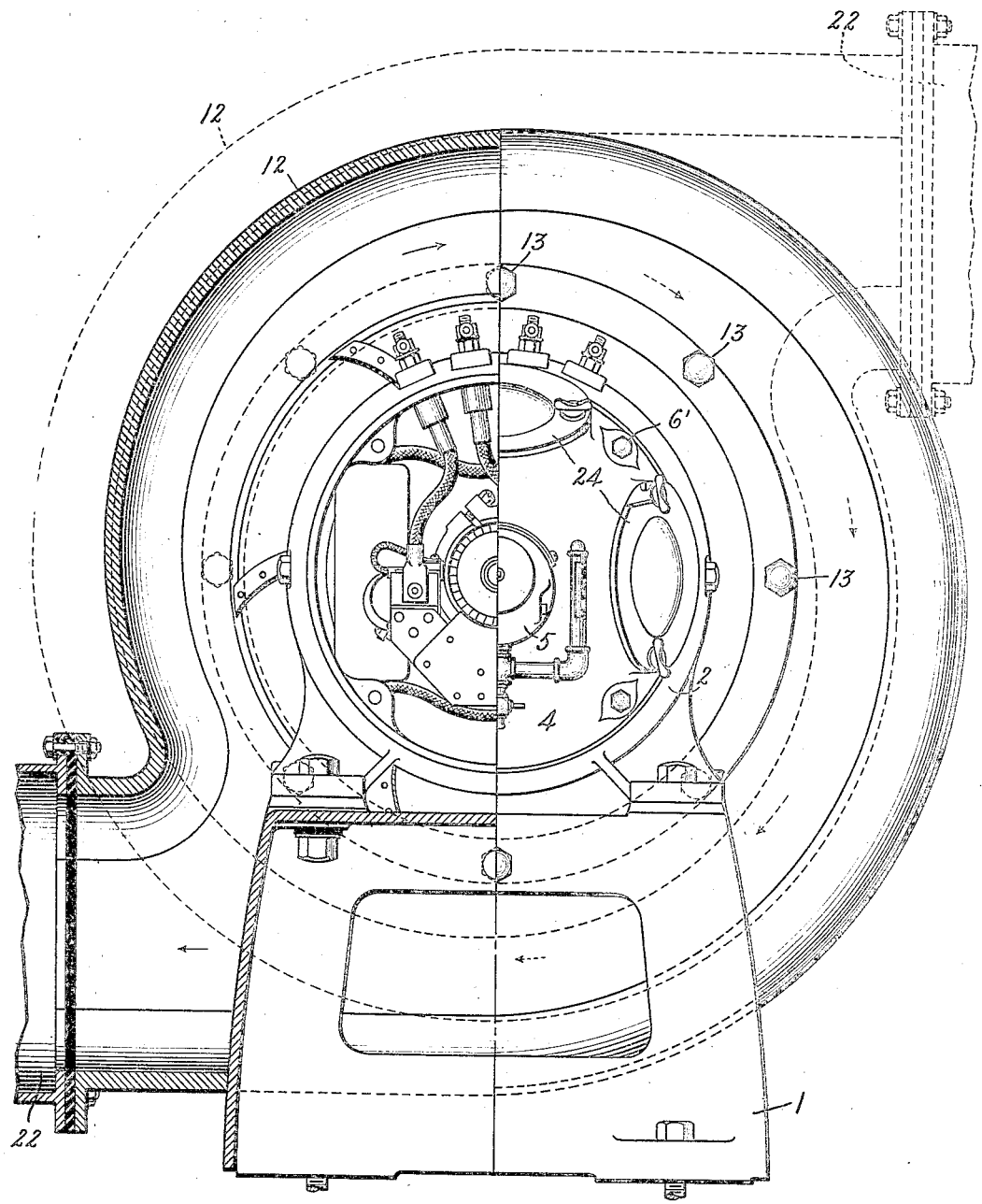

UNITED STATES PATENT OFFICE.

EDGAR J. McDUFFEE, OF LYNN, MASSACHUSETTS, ASSIGNOR TO GENERAL ELECTRIC COMPANY, A CORPORATION OF NEW YORK.

ELECTRICALLY-DRIVEN FAN OR BLOWER.

No. 919,623.   Specification of Letters Patent.   Patented April 27, 1909.

Application filed March 17, 1905. Serial No. 250,550.

*To all whom it may concern:*

Be it known that I, EDGAR J. MCDUFFEE, a citizen of the United States, residing at Lynn, in the county of Essex and State of Massachusetts, have invented certain new and useful Improvements in Electrically-Driven Fans or Blowers, of which the following is a specification.

The object of my present invention is to improve the construction of fans or blowers, particularly fans or blowers driven by electric motors.

In carrying out my invention, I construct and arrange the parts so that the admission of air to the blower and its discharge therefrom takes place in a highly advantageous manner. The construction which I have produced permits of numerous variations in the arrangement of the parts and the operation of the blower to suit different conditions of service.

The various features of novelty which characterize my invention are pointed out with particularity in the claims annexed to and forming a part of this specification. For a better understanding of my invention, however, reference may be had to the accompanying drawings and description in which I have illustrated a motor-driven fan motor constructed in accordance with my invention.

Figure 1:
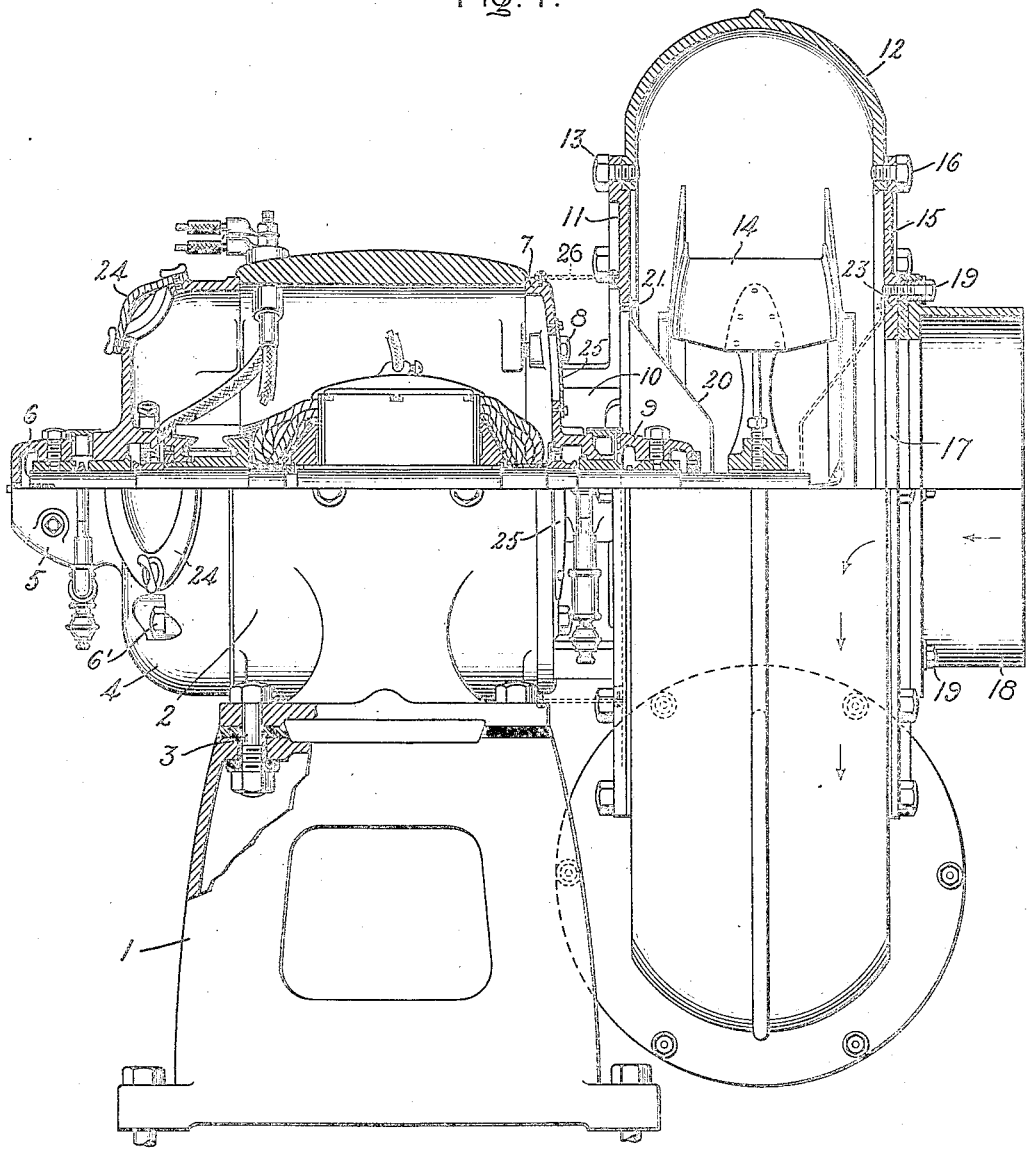
Figure 2:
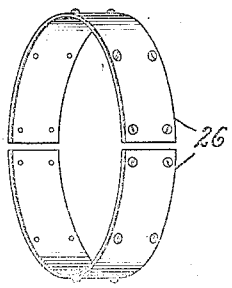

Of the drawings, Figure 1 is a side elevation with parts broken away and in section; Fig. 2 is a perspective view showing details;
and Fig. 3 is an end elevation with parts broken away and in section.

Referring to the drawings, 1 represents a base member to the upper side of which is secured the field ring 2 of an electric motor by suitable bolts 3. To the left-hand end of the field ring 2, as seen in Fig. 3, is secured an end member or head 4 provided with a bearing box 5 in which one end of the armature shaft 6 of the motor is journaled. The head 4 is secured to the field ring 2 by suitable bolts 6'. A head or end member 7 is secured to the right-hand end of the field ring 2 as seen in Fig. 1, by bolts 8. The head member 7 carries a bearing box 9 in which the other end of the armature shaft 6 is journaled.

Ribs or arms 10 projecting substantially parallel with the armature shaft 6 from the end member 7 support at their outer ends an annular member 11. The blower or fan casing 12 which is in the usual form is secured to the annular member 11 by similar bolts 13. The ends of the casing 12, which are similar, have large openings formed in them. The blower proper or fan 14 is secured to the end of the shaft 6 which projects into the blower casing through one of the end openings for the purpose. An annular member 15 is secured to the right-hand end of the blower casing 12 by bolts 16 which are similar and similarly placed to the bolts 13. The annular member 15 is provided with a centrally-formed aperture 17. A cylinder, barrel or intake member 18 is secured to the annular member 15 near its inner periphery by bolts 19.

In the construction shown in Fig. 1, a diaphragm or partition 20 is secured to the inner side of the annular member 11 near its inner periphery by screws 21. The diaphragm 20, which is dished, projects under the fan blades of the blower 14 and is formed with an aperture of a diameter just sufficient to allow the passage of the shaft 6. With this arrangement of parts the air enters the blower casing through the cylindrical extension 18 and is discharged through the tangential discharge opening 22. The direction of the air current is indicated by the arrows in Figs. 1 and 3. The bolts 13 are arranged in a circle about the shaft 6 as a center and are equally spaced apart. By reason of this arrangement the blower casing with its tangential discharge opening 22 may be angularly adjusted about the shaft 6 as an axis. For instance, in Fig. 3 I have shown in dotted lines the position assumed by the parts when the casing 12 is given a half turn about the shaft 6 as an axis. Any other desired angular movement which is a multiple of the arc between adjacent bolts 13 may be obtained. As the opposite sides of the casing 12 are exactly alike, by removing the bolts 13 and 16 the casing may be turned end for end, so that when the discharge opening 22 is horizontal at the bottom, as shown in Fig. 3, it will be at the right instead of at the left as at present. If the fan blades are not radial it is usually desirable to change the fan end for end with respect to the motor and reverse the rotation of the motor when the blower casing is turned end for end.

When it is desired to take air into the blower casing from the motor side of the blower the outer side of the diaphragm 20 may be secured to the inner side of the member 15, as shown in dotted lines in Fig. 1. Suitable holes 23 are formed in the inner side of the member 15 into which the bolts 21 may be secured. The change in position of the diaphragm 20 allows of the admission of air into the casing from the motor side, and prevents admission of air into the casing through the extension 18.

When it is found necessary or desirable to draw air into the motor casing through the motor in order to cool the latter, or for any other purpose, doors 24, closing openings in the end member 4, and doors 25, closing openings formed in the portion of the member 7 within the arms 10, are removed. At the same time curved cover plates 26 are put in place, as shown in dotted lines in Fig. 1, so that they form a cylindrical casing connecting the outer unperforated portion of the end member 7 with the inner periphery of the annular member 11. With this arrangement it is, of course, understood that the diaphragm 20 is placed to close the opening in the annular member 15. The arrangement just described results in a material reduction in the temperature of the motor by causing the heat generated in the operation of the motor to be carried away. In some cases it may be desirable to leave off one or both of the cover plates 26 in order that part of the air moved by the fan may be drawn through the motor, while the rest is drawn in through the spaces between the arms 10.

It will be obvious to those skilled in the art that the construction herein described and illustrated, while simple, readily made and readily assembled, permits of a large number of variations in arrangement and operation.

While I have hereinbefore illustrated and described one embodiment of my invention, it will be obvious to those skilled in the art that changes may be made in the form of my invention without departing from its spirit.

What I claim as new and desire to secure by Letters Patent of the United States, is,

1. In combination, an electric motor, a fan blower driven thereby, and means for causing more or less as desired of the air displaced by the blower to be drawn through the motor.

2. In combination, the field ring of an electric motor, a blower casing, a member engaging the field ring of the motor and the blower casing, said member being formed with an opening through which air may pass to the blower casing, and means for closing more or less of said opening.

3. In combination, an electric motor comprising a field ring and an armature shaft, a fan mounted on one end of said shaft, a fan casing surrounding said fan, a motor end member provided with a portion or extension to which the fan casing is secured, said extension or portion being formed with an opening through which air may pass into the fan casing, and means for closing more or less of said opening.

4. In combination, a blower casing, a field ring of an electric motor, an end member secured to said field ring, said end member being formed with openings through which air may pass to the blower casing, and means for closing some of said openings.

5. In combination, an electric motor, a blower casing, and a cylindrical cover plate engaging the blower casing and said electric motor, said motor comprising a field ring, an end member secured thereto and formed with openings through which air may pass to the blower casing, and means for closing some of said openings.

In witness whereof, I have hereunto set my hand this twentieth day of February, 1905.

EDGAR J. McDUFFEE.

Witnesses:
 JOHN A. McMANUS, Jr.,
 HENRY O. WESTENDARP.